(12) United States Patent
Chamberlain

(10) Patent No.: US 8,165,131 B2
(45) Date of Patent: *Apr. 24, 2012

(54) GENERIC INFORMATION ELEMENT

(75) Inventor: Elizabeth Chamberlain, Plano, TX (US)

(73) Assignee: Rockstar Bidco, LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/085,703

(22) Filed: Apr. 13, 2011

(65) Prior Publication Data

US 2011/0191421 A1    Aug. 4, 2011

Related U.S. Application Data

(62) Division of application No. 10/741,107, filed on Dec. 19, 2003, now Pat. No. 7,933,275.

(51) Int. Cl.
*H04L 12/28* (2006.01)
*H04L 12/56* (2006.01)
*H04W 4/00* (2009.01)
*H04J 3/16* (2006.01)
*H04J 3/24* (2006.01)

(52) U.S. Cl. ............ 370/395.3; 370/329; 370/401; 370/466; 370/474

(58) Field of Classification Search ......... 370/329, 370/395.3, 401, 466, 474
See application file for complete search history.

(56) References Cited

U.S. PATENT DOCUMENTS 7,933,275 B2 * 4/2011 Chamberlain ............ 370/395.3
* cited by examiner

*Primary Examiner* — Ronald Abelson
(74) *Attorney, Agent, or Firm* — Haynes and Boone, LLP

(57) ABSTRACT

A computer data signal embodied in a non-transitory computer-readable medium is described. In one embodiment, the computer data signal includes a generic element identifier, a plurality of task-specific data, a variable length identifier and a multi-use data type identifier. The generic element identifier is configurable to identify an information element containing the generic element identifier as a generic information element. The variable length identifier is configurable to indicate a number of the plurality of task-specific data. The multi-use data type identifier is configurable to indicate a type of the plurality of task-specific data.

24 Claims, 3 Drawing Sheets

Fig. 4

| 7 | 6 | 5 | 4 | 3 | 2 | 1 | 0 |
|---|---|---|---|---|---|---|---|
| 1 | 1 | 0 | 0 | 1 | 0 | 0 | 0 |
| 0 | 0 | 0 | 0 | 1 | 0 | 1 | 0 |
| 0 | 0 | 1 | 0 | 1 | 0 | 1 | 0 |
| 1 | 0 | 1 | 1 | 1 | 0 | 0 | 1 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 0 | 1 | 0 |
| 0 | 0 | 0 | 0 | 0 | 0 | 0 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 0 | 1 | 1 | 0 | 1 | 0 | 1 |

Fig. 5

| 7 | 6 | 5 | 4 | 3 | 2 | 1 | 0 |
|---|---|---|---|---|---|---|---|
| 1 | 1 | 0 | 0 | 1 | 0 | 0 | 0 |
| 0 | 0 | 0 | 0 | 1 | 1 | 0 | 1 |
| 1 | 0 | 1 | 0 | 0 | 0 | 1 | 1 |
| 0 | 1 | 0 | 0 | 1 | 0 | 0 | 0 |
| 0 | 1 | 1 | 0 | 0 | 0 | 0 | 1 |
| 0 | 1 | 1 | 0 | 1 | 1 | 1 | 0 |
| 0 | 1 | 1 | 0 | 1 | 1 | 1 | 0 |
| 0 | 1 | 1 | 0 | 0 | 0 | 0 | 1 |
| 0 | 1 | 1 | 0 | 1 | 0 | 0 | 0 |
| 0 | 0 | 1 | 0 | 1 | 1 | 0 | 1 |
| 0 | 1 | 1 | 0 | 0 | 0 | 1 | 1 |
| 0 | 1 | 1 | 0 | 0 | 0 | 1 | 1 |
| 0 | 1 | 1 | 0 | 0 | 1 | 0 | 1 |
| 0 | 1 | 1 | 0 | 1 | 1 | 0 | 0 |
| 0 | 0 | 0 | 0 | 0 | 0 | 0 | 0 |

GENERIC INFORMATION ELEMENT

CROSS-REFERENCE UNDER 35 U.S.C. §120

The application claims the benefit under 35 U.S.C. §120 of commonly-assigned, co-pending U.S. patent application Ser. No. 10/741,107, filed on Dec. 19, 2003, which is hereby incorporated by reference in its entirety.

BACKGROUND

The present disclosure relates generally to information elements employed in telecommunications networks and, more specifically, to a generic information element.

In a telecommunications network, information elements are employed to transfer information between network nodes, such as those regarding requests or commands to be performed by the destination node. An information element is a group of information which may be included within a signaling message or data flow which is sent across an interface. Examples may include QoS (Quality of Service) definitions, setup parameters, user identifiers, etc. Interface standards such as the Interoperability Specification (IOS) for Cmda2000® govern the format of many such information elements. For example, a specific request, command, data transfer or other task may employ an information element having a task-specific format stipulated by the IOS or another standard.

As new telecommunications features or activities are created, specifications for the corresponding new information elements are submitted for inclusion in the applicable standard. However, the inclusion of the specifications for the new feature into the applicable standard is a time-intensive process and can delay product release up to 18 months. In many instances, this delay is detrimental, possibly catastrophic, to the new feature. For example, market demand for the new feature may substantially subside in the 18 months elapsing between identification of a product need and subsequent product delivery.

Accordingly, what is needed is an information element and method of use thereof that addresses the issues discussed above.

SUMMARY

The present disclosure introduces a wireless communication system including a first station having first communication software for generating and transmitting a first message having a task-specific format and a second message having a task-independent format. The wireless communication system also includes a second station having second communication software for receiving and processing the first and second messages.

A method of communicating between telecommunications network stations is also provided in the present disclosure. In one embodiment, the method includes populating a message having a task-independent format with task-specific data, transmitting the message, and receiving the message.

The present disclosure also provides a computer data signal possibly embodied in a non-transitory computer-readable medium and comprising a generic element identifier configurable to identify an information element containing the generic element identifier as a generic information element. The computer data signal also includes a plurality of task-specific data, a variable length identifier configurable to indicate a number of the plurality of task-specific data, and a multi-use data type identifier configurable to indicate a type of the plurality of task-specific data.

The present disclosure also provides a method for communicating non-standardized action defining information over a standardized interface between at least two network nodes. In one embodiment, the method includes sending a standardized message from one node to at least another node, wherein the message includes: (1) a data field containing a generic data element identifier configurable to identify one of a plurality of non-standardized actions to be taken by the nodes receiving the message; (2) a plurality of task-specific data further characterizing the non-standardize action to be taken by the nodes receiving the message; (3) a variable length identifier to identify the length of the task-specific data; and (4) a multi-use data identifier configurable to indicate the type of the plurality of task-specific data.

The foregoing has outlined features of several embodiments so that those skilled in the art may better understand the detailed description that follows. Additional features will be described below that further form the subject of the claims herein. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4 illustrates a block diagram of another example of a populated embodiment of a generic information element according to aspects of the present disclosure.

FIG. 5 illustrates a block diagram of another example of a populated embodiment of a generic information element according to aspects of the present disclosure.

DETAILED DESCRIPTION

Figure 1:
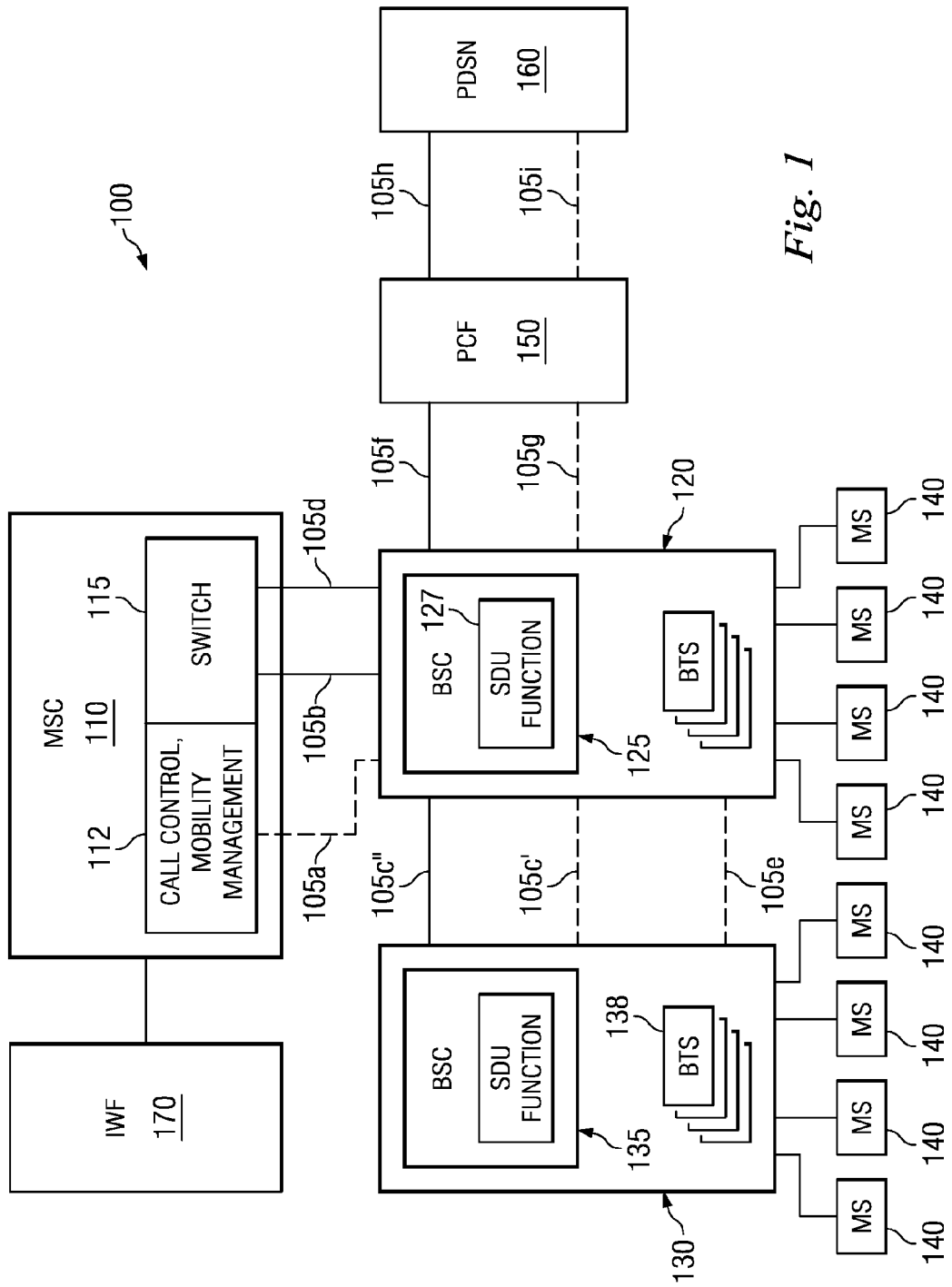
FIG. 1 illustrates a block diagram of one embodiment of a telecommunications network employing generic information elements according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, illustrated is a block diagram of a telecommunications network 100 within which a generic or multi-use (hereafter collectively referred to as generic) information element according to aspects of the present disclosure may be employed. FIG. 1 illustrates the relationship among networked components in support of mobile originations, mobile terminations and direct BS-to-BS handoff operations, among others. The telecommunications network 100 includes a mobile switching center (MSC) 110, a source base station (BS) 120 and one or more target BS 130. The source BS 120 is configured to communicate with the MSC 110 and the target BS 130. The source BS 120 and the target BS 130 are each configured to communicate with mobile stations (MS) 140.

The source BS 120 identifies where the equipment that generates a call or calls is placed. The source BS 120 comprises a base station controller (BSC) 125, a selection/distribution unit (SDU) 127 and one or more base transceiver stations (BTS) 128. In general, base stations provide the functionality that enables a mobile station to access network services over the air interface. The source BS 120 is a term used to identify the base station that is in control of the call. The target BS 130 identifies any base station, excluding the source BS 120, that supports a call. However, like the source BS 120, the target BS 130 comprises a BSC 135, an SDU 137 and one or more BTS 138.

The MSC 110 is a telecommunication switch or exchange which is capable of interworking with location databases. The MSC 110 may be a portion of a core network, which may be an evolved global system for mobile communication (GSM) core network infrastructure, a universal mobile telecommunications system (UMTS) core network infrastructure, or a code division multiple access (CDMA) network infrastructure, integrating circuit and packet switched traffic. In addition to the MSC 110, such a core network may include such functions as a visitor location register (VLR), a home location register (HLR), a serving GPRS support node (SGSN) and a gateway GPRS support node (GGSN), among others.

Each MS 140 comprises a wireless terminal enabling a user to access network services, such as cellular phones, personal digital assistants (PDAs), pagers and other wireless terminals. Each MS 140 may also comprise mobile equipment (ME) and either a programmed user identity module (UIM) or a removable user identity module (R-UIM).

The telecommunications network 100 may also include a packet control function (PCF) 150 and a packet data serving node (PDSN) 160. The PCF 150 controls the transmission of packets between the source BS 120 and the PDSN 160. The PDSN 160 is responsible for the establishment, maintenance and termination of a point-to-point protocol (PPP) session towards a MS 140. The PDSN 160 may also assign dynamic interne protocol (IP) addresses in addition to supporting mobile IP functionality.

An A1 interface 105a carries signaling information between call control and mobility management functions 112 of the MSC 110 and a call control component of the source BS 120, such as a base station controller (BSC) 125. Such signaling information may include various commands and requests between the source BS 120 and the MSC 110, possibly in the form of one or more generic information elements constructed according to aspects of the present disclosure. Thus, the source BS 120 and the MSC 110 may each include software for generating, transmitting, receiving and/or processing such generic information elements. Of course, the source BS 120 and the MSC 110 may also exchange information by conventional information elements having formats specific to the tasks to be performed. As such, the BSC 120 and the MSC 110 may also include software for generating, transmitting, receiving and/or processing conventional information elements.

An A2 interface 105b provides a path for user traffic. The A2 interface 105b carries 64/56 kbps pulse code modulation (PCM) information for circuit-oriented voice communication, or 64 kbps unrestricted digital information (UDI) for integrated service digital network (ISDN) communication, between a switch component 115 of the MSC 110 and an SDU 127 of the source BS 120.

An A3 interface 105c is used to transport user traffic and signaling for inter-BS handoff when a target BS 130 is attached to a frame selection function within the source BS 120. The A3 interface 105c carries coded user information (voice/data) and signaling information between the SDU 127 and the BTS 138 or another channel element component or other component of the target BS 130. The A3 interface 105c comprises two parts: a signaling portion 105c' and user traffic portion 105c". The signaling information is carried across the logical channel 105c' separate from the user traffic channel 105c" and controls the allocation and use of channels for transporting user traffic. Such signaling information may include various commands and requests, possibly in the form of one or more generic information elements constructed according to aspects of the present disclosure. Thus, in addition to the source BS 120, the target BS 130 may include software for generating, transmitting, receiving and/or processing such generic information elements. Of course, the source BS 120 and the target BS 130 may also exchange information by conventional information elements having formats specific to the tasks to be performed. As such, the target BS 130 may also include software for generating, transmitting, receiving and/or processing conventional information elements.

An A5 interface 105d provides a path for user traffic for circuit-oriented data calls between the source BS 120 and the MSC 110. The A5 interface 105d carries a full duplex stream of bytes between the switch component 115 of the MSC 110 and the SDU 127 of the source BS 120. Such signaling information may include various commands and requests, possibly in the form of one or more generic information elements constructed according to aspects of the present disclosure.

An A7 interface 105e carries signaling information between the source BS 120 and the target BS 130 for inter-BS handoff. Such signaling information may include various commands and requests, possibly in the form of one or more generic information elements constructed according to aspects of the present disclosure.

An A8 interface 105f carries user traffic between the source BS 120 and the PCF 150. An A9 interface 105g carries signaling information between the source BS 120 and the PCF 150. Such signaling information may include various commands and requests, possibly in the form of one or more generic information elements constructed according to aspects of the present disclosure. Thus, in addition to the source BS 120, the PCF 150 may include software for generating, transmitting, receiving and/or processing such generic information elements. Of course, the source BS 120 and the PCF 150 may also exchange information by conventional information elements having formats specific to the tasks to be performed. As such, the PCF 150 may also include software for generating, transmitting, receiving and/or processing conventional information elements.

An A10 interface 105h carries user traffic between the PCF 150 and the PDSN 160. An A11 interface 105i carries signaling information between the PCF 150 and the PDSN 160. Such signaling information may include various commands and requests, possibly in the form of one or more generic information elements constructed according to aspects of the present disclosure. Thus, in addition to the PCF 150, the PDSN 160 may include software for generating, transmitting, receiving and/or processing such generic information elements. Of course, the PCF 150 and the PDSN 160 may also exchange information by conventional information elements having formats specific to the tasks to be performed. As such, the PDSN 160 may also include software for generating, transmitting, receiving and/or processing conventional information elements.

The network 100 may also include an interworking function (IWF) 170 for circuit-oriented calls possibly located with the MSC 110. Also, the SDU function 127 is considered to be co-located with the source BSC, although other locations of the SDU 127 within the network 100 are within the scope of the present disclosure.

FIG. 1 illustrates a logical architecture that does not imply any particular physical implementation. Of course, aspects of the present disclosure are applicable and/or readily adaptable to other architecture, arrangements and networks.

Thus, at least in the illustrated embodiment, as discussed above, a generic information element according to aspects of the present disclosure may be employed for interfaces carrying signaling information between:
  the source BS 120 and the MSC 110 (e.g., BS management information);
  the MS 140 and the MSC 110 via the source BS 120 or the target BS 130 (e.g., the source BS 120 maps air-interface messages to the A1 interface 105*a*);
  the source BS 120 and other network elements via the MSC 110;
  the source BS 120 and the target BS 130;
  the source BS 120 and the PCF 150;
  the PCF 150 and the PDSN 160; and
  the MS 140 and the PDSN 160 (e.g., authorization information and mobile internet protocol (MIP) signaling).

Figure 2:
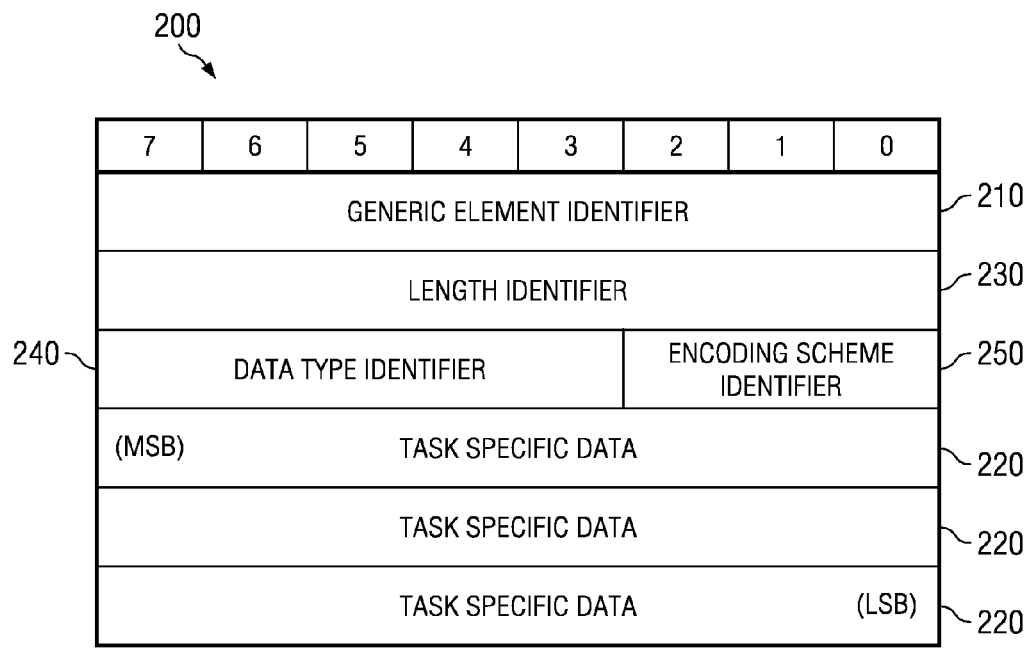
FIG. 2 illustrates a block diagram of one embodiment of a generic information element according to aspects of the present disclosure.

Referring to FIG. 2, illustrated is a diagram of one embodiment of a generic information element 200 constructed according to aspects of the present disclosure. The generic information element 200 includes a generic element identifier field 210, task specific data fields 220, a variable length identifier 230 and a multi-use data type identifier 240. The generic information element 200 may also include an encoding scheme identifier 250. The generic information element 200 may be employed to communicate non-standardized actions defining information over a standardized interface between at least two network nodes, such as the standardized interfaces and network nodes discussed above with regard to FIG. 1.

The generic element identifier 210 is configurable to identify the information element 200 as a generic information element constructed/employed according to aspects of the present disclosure. The generic element identifier 210 may also be configurable to identify one of a plurality of specific tasks to be performed by a telecommunications network node in response to a request or command embodying or embodied by the generic information element 200. The variable length identifier 230 is configurable to indicate a quantity of the task-specific data contained in the generic information element 200. For example, the length indicator 230 may specify the number of octets which make up the generic information element 200 after being populated with task-specific data, or may specify the number of task-specific data fields 220. The variable length identifier 230 may also be employed to mark a specific element within an information element or frame. In one embodiment, the length indicator 230 identifies the number of octets or data fields of other lengths that follow the length identifier 230.

The task-specific data fields 220 may comprise any number of octets or data elements/fields of other lengths that are required for a particular task. In the embodiment shown in FIG. 2, three octets are included in the information element 200. In some embodiments, the generic information element 200 may not comprise any data octets in/as the data fields 220. Also, as depicted in FIG. 2, the left-most bits in each of the data fields 220 shown in FIG. 2 may be the most significant bits, and the right-most bits may be the least significant bits. The data fields 220 may also comprise more than one octet. In such embodiments, the first octet in the data field 220 may comprise the most significant bit in the field and the last octet in the field may comprise the least significant bit in the field. In some embodiments, the generic information element 200 includes up to 24 octets in the data fields 220, up to 24 data fields 220, or up to 192 bits in the data fields 220. Of course, data structures and arrangements other than those discussed above are also within the scope of the present disclosure.

The multi-use data type identifier 240 is configurable to indicate a type of the plurality of task-specific data populating the data fields 220. For example, the types of data may include authentication codes, personal identification numbers, feature codes, traffic band management (TBM) information and packet data billing information. In one embodiment, the multi-use data type identifier 240 may carry a value representing a data type selecting from up to 31 types of data.

The encoding scheme identifier 250 may indicate an encoding scheme employed to encode the task-specific data in the data fields 220. For example, the data fields 220 may be populated with data that is binary coded decimal (BCD) even, BCD-odd, binary or ASCII coded.

The generic information element 200 may be employed for or added to telecommunication signaling messages for tasks that may or may not have standardized information elements associated therewith. For example, the generic information element 200 may be added to a connection management (CM) service request, a paging request, a paging response, a connect message, an assignment message, an assignment complete message, an assignment request message, a base station service request, a flash with information message, a location updating request, an application data delivery service (ADDS) transfer message, an ADDS deliver message and other messages.

The generic information element 200 may be added as an operational conditional element. The conditions for inclusion of the element in such applications may be defined in the operations where the message is used and in footnotes associated with a table defining the order of the information elements in the message.

Thus, the generic information element 200 is employable in myriad applications. For example, the generic information element 200 is acceptable by any IOS compliant MSC or BS receiving the element 200 regardless of whether or not the receiving MSC or BS recognizes the contents of the element 200. One such application is packet data billing, which allows wireless customers to bill or be billed based on a variety of characteristics, including QoS, zone and transmission rate. The generic information element 200 also allows storage of mobile information in the VLR and HLR outside of standard, defined scenarios.

Figure 3:
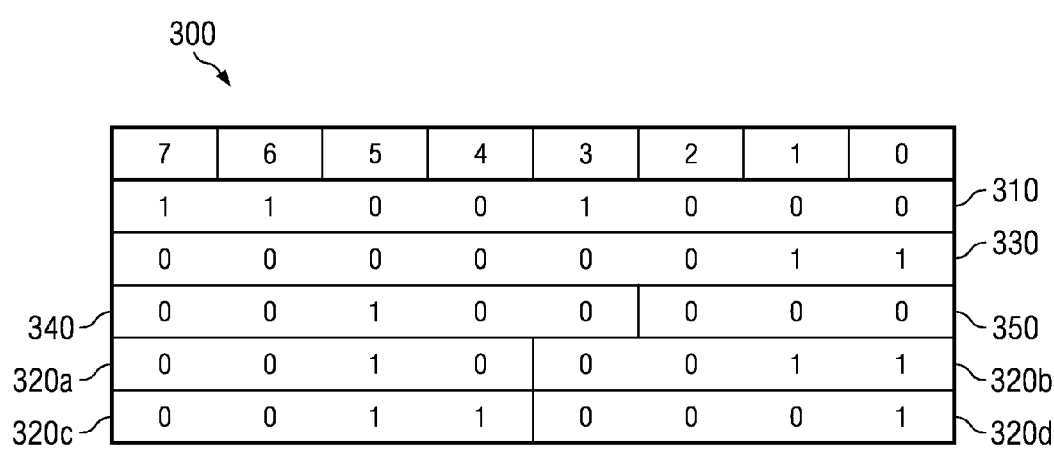
FIG. 3 illustrates a block diagram of an example of a populated embodiment of a generic information element according to aspects of the present disclosure.

Referring to FIG. 3, illustrated is an example of the generic information element 200 shown in FIG. 2 populated with task-specific data, the populated generic information element herein designated by the reference numeral 300. The generic information element 300 shown in FIG. 3 may be employed in a TBM application. TBM allows the MSC to indicate to the BSC which bands the MS supports. The BSC can then balance traffic across the bands it supports and select the band that is least utilized. In such an application, the data type may be "TBM", which may be indicated by the numeral 4 in an applicable standard. The standard may also indicate that the first data field includes a redirection indication, wherein a zero value indicates redirection is not supported, a 1 indicates redirection is supported for 2G only, a 2 indicates redirection is supported for 3G only, and a 3 indicates redirection is supported for 2G and 3G. Similarly, subsequent data fields may be employed to indicate band class information, wherein a zero value indicates an 800 MHz band, a 1 indicates a 1900 MHz band, a 2 indicates an analog band, a 3 indicates a wide analog band, and a 4 indicates a narrow analog band.

The generic information element identifier 310 is 200 (11001000 in binary). This value may indicate that the information element 300 is a generic information element according to the applicable standard. The length indicator 330 indicates that 3 octets follow the length indicator 330. The encoding scheme identifier 350 carries the value zero, which may identify the coding scheme as BCD-even in the applicable standard. The data type identifier 340 carries the value 4, which may identify the task-specific data in the data fields 320a-d as pertaining to TBM in the applicable standard. Per the example described above, the data in the first data field 320a indicates what type of redirection is supported and the data in the 3 subsequent data fields 320b-d indicate which bands are supported. For example, the data in the first data field 320a carries the value 3, indicating that redirection is supported for 2G and 3G mobiles according to the applicable standard. Similarly, the data in the second data field 320b carries the value 2, the data in the third data field 320c carries the value 1, and the data in the fourth data field 320d carries the value 3, indicating that the mobile supports analog, 1900 MHz and wide analog according to the applicable standard. The applicable standard in the present examples may be the IOS standard discussed above and/or another standard and/or protocol agreed upon by partnering entities utilizing the telecommunications network in which the generic information element 300 is employed.

Referring to FIG. 4, illustrated is another example of the generic information element 200 shown in FIG. 2 populated with task-specific data, the populated generic information element herein designated by the reference numeral 400. The generic information element 400 shown in FIG. 4 may be employed in a packet data billing application. Packet data billing allows the BSC to send packet data session information to the MSC for use in CDR generation or sending to downstream billing processors. Some packet zones may be more expensive than others, such as zones covering airport terminals or the floor of the New York Stock Exchange that may be more expensive than zones covering a local zoo or restaurant. In such an application, the data type may be "packet data billing", which may be indicated by the numeral 5 in then applicable standard. The standard may also indicate that the first data field includes a packet zone identification indicating the packet zone in which the MS is located. Similarly, the data field comprising the next 4 octets may be employed to indicate the number of octets or other data elements transmitted in the forward direction and the data field comprising the next 4 octets may be employed to indicated the number of octets or other data elements transmitted in the reverse direction.

The generic information element identifier 410 is 200, as with the generic information element identifier 310 in the generic information element 300 shown in FIG. 3. The length indicator 430 indicates that 10 octets follow the length indicator 430. The encoding scheme identifier 450 carries the value 2, which may identify the coding scheme as binary encoding in the applicable standard. The data type identifier 440 carries the value 5, which may identify that the task-specific data in the data fields 420a-c pertains to packet data billing in the applicable standard. The data in the first data field 420a indicates that the MS is in packet zone 185, the data in the second data field 420b (wherein the most significant bit is the top-left bit in the field 420b and the least significant bit is the bottom-right bit in the field 420b) indicates that 64001 octets are transmitted in the forward direction, and the data in the last data field 420c indicates that 181 octets are transmitted in the reverse direction.

Referring to FIG. 5, illustrated is another example of the generic information element 200 shown in FIG. 2 populated with task-specific data, the populated generic information element herein designated by the reference numeral 500. The generic information element 500 shown in FIG. 5 may be employed in a personal caller identification (ID) application. In such an application, a MS user can program a personal caller ID text string to be displayed on a terminating or destination MS. In such an application, the data type may be "personal caller ID", which may be indicated by the numeral 20 in the applicable standard. The data type may carry a proprietary value, such that the information in the generic information element 500 may only be understood by an entity creating the standard or protocol and its vendors (which may also be true for generic information elements containing data of types of than "personal caller ID"). Each of the data fields 520a-l may carry an ASCII value of an alphanumeric character in the personal caller ID text string. In the present example, the length of the personal caller ID text string is limited to 12 characters.

The generic information element identifier 510 is 200, as with the generic information element identifier 310 in the generic information element 300 shown in FIG. 3. The length indicator 530 indicates that 13 octets follow the length indicator 530. The encoding scheme identifier 550 carries the value 3, which may identify the coding scheme as ASCII encoding in the applicable standard. The data type identifier 540 carries the value 20, which may identify that the task-specific data in the data fields 520a-l pertain to personal caller ID in the applicable standard. The data in the first through sixth data fields 520a-f represent the alphanumeric characters "H", "a", "n", "n", "a", and "h". The seventh data field 520g represents the alphanumeric character "-". The data in the eighth through eleventh data fields 520h-k represent the alphanumeric characters "c", "e", "l", and "l". The last data field 520l is not used in the present example. Thus, the personal caller ID in this example is "Hannah-cell".

Thus, the present disclosure introduces a generic information element comprising a generic element identifier, a plurality of task-specific data, a variable length identifier and a multi-use data type identifier. The generic element identifier is configurable to identify one of a plurality of specific tasks to be performed by a telecommunications network node or to identify the information element as a generic information element. The variable length is identifier is configurable to indicate a number of the plurality of task-specific data. The multi-use data type identifier is configurable to indicate a type of the plurality of task-specific data. Moreover, in view of the information element being employed to transfer a signaling message or data flow across an interface in a telecommunications network, the information element may be a computer data signal, such as a data signal embodied in a carrier wave or non-transitory computer-readable medium.

A wireless communication system is also provided in the present disclosure. In one embodiment, the system includes a first station having first communication software for generating and transmitting a first message having a task-specific format and a second message having a task-independent format. The system also includes a second station having second communication software for receiving and processing the first and second messages.

A method of communicating between telecommunications network stations is also provided in the present disclosure. In one embodiment, the method includes populating a message having a task-independent format with task-specific data, transmitting the message, and receiving the message. The present disclosure also introduces a method of using task-specific data comprising, in one embodiment, arranging the task-specific data in a message having a task-independent format, transmitting the message, receiving the message, and processing the task-specific data.

Another method of communication between telecommunications network nodes according to aspects of the present disclosure includes generating a plurality of messages including: (1) at least one first message having first task-specific data arranged in a task-specific format; and (2) at least one second message having second task specific data arranged in a task-independent format. The method also includes transmitting the plurality of messages between the telecommunications network nodes and processing the messages.

The present disclosure also provides a method for communicating non-standardized action defining information over a standardized interface between at least two network nodes. In one embodiment, the method includes sending a standardized message from one node to at least another node, wherein the message includes: (1) a data field containing a generic data element identifier configurable to identify one of a plurality of non-standardized actions to be taken by the nodes receiving the message; (2) a plurality of task-specific data further characterizing the non-standardize action to be taken by the nodes receiving the message; (3) a variable length identifier to identify the length of the task-specific data; and (4) a multi-use data identifier configurable to indicate the type of the plurality of task-specific data.

Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A computer data signal embodied in a non-transitory computer-readable medium, the computer data comprising:
   a generic element identifier configurable to identify an information element containing the generic element identifier as a generic information element;
   a plurality of task-specific data;
   a variable length identifier configurable to indicate a number of the plurality of task-specific data; and
   a multi-use data type identifier configurable to indicate a type of the plurality of task-specific data.

2. The signal of claim 1 wherein the generic element identifier, the plurality of task-specific data, the variable length identifier and the multi-use data type identifier collectively populate a generic information element.

3. The signal of claim 1 wherein the generic element identifier, the plurality of task-specific data, the variable length identifier and the multi-use data type identifier collectively form a generic information element.

4. The signal of claim 1 further comprising an encoding scheme identifier indicating a scheme employed to encode the plurality of task-specific data.

5. The signal of claim 1 wherein the signal relays information regarding a task not having a standardized information format associated therewith.

6. The signal of claim 1 wherein the signal includes up to 24 octets.

7. A method for communicating action defining information over a standardized interface between at least two network nodes, the method comprising:
   sending a message from one node to another node, the message including:
      a data element containing a generic data element identifier configured to identify one of a plurality of actions to be taken by the node receiving the message
      a plurality of task-specific data further characterizing the action to be taken by the node receiving the message;
      a variable length identifier to identify the length of the task-specific data; and
      a multi-use data identifier configured to indicate the type of the plurality of task-specific data.

8. The method of claim 1 wherein the message additionally includes an encoding scheme identifier to identify an encoding scheme utilized in encoding.

9. A method of communicating messages in a telecommunication system, the method comprising:
   generating messages at a first station; and
   transmitting the messages to a second station via an Ax interface;
   wherein at least one of the messages comprises a format for communicating generic information elements each defining a task to be performed by the second station, each generic information element comprising:
      a generic element identifier field that identifies the generic information element as a generic information element and also identifies one of a plurality of tasks to be performed by the second station;
      data fields that comprise task data required for a task;
      a variable length indicator that indicates a quantity of the task data contained in the generic information element; and
      a multi-use data type identifier that identifies which of a plurality of types of task data populates the task data fields.

10. The method of claim 9 wherein the variable length indicator indicates the number of octets that make up the generic information element after being populated with the task data.

11. The method of claim 9 wherein the variable length indicator indicates the number of task data fields.

12. The method of claim 9 wherein the plurality of types of task data includes at least one of authentication codes, personal identification numbers, feature codes, traffic band management (TBM) information, and packet data billing information.

13. The method of claim 9 wherein at least one of the messages comprises at least one of a connection management (CM) service request, a paging request, a paging response, a connect message, an assignment message, an assignment complete message, an assignment request message, a base station service request, a flash with information message, a location updating request, an application data delivery service (ADDS) transfer message, and an ADDS deliver message.

14. The method of claim 9 wherein each generic information element further comprises an encoding scheme identifier that identifies an encoding scheme employed to encode the task data in the task data fields.

15. The method of claim 14 wherein the encoding scheme is one of binary coded decimal (BCD) even, BCD-odd, binary, and ASCII.

16. The method of claim 9 wherein the telecommunication system comprises a wireless communication system and wherein at least one of the first and second stations comprises one of a base station, a mobile station, a mobile switching center, a packet data serving node, and a packet control function.

17. A method of communicating messages in a telecommunication system, the method comprising:
  receiving at a first station messages generated by a second station, wherein the messages are received at the first station via an Ax interface; and
  processing the received messages at the first station;
  wherein at least one of the messages comprises a format for communicating generic information elements each defining a task to be performed by the second station, each generic information element comprising:
    a generic element identifier field that identifies the generic information element as a generic information element and also identifies one of a plurality of tasks to be performed by the second station;
    data fields that comprise task data required for a task;
    a variable length indicator that indicates a quantity of the task data contained in the generic information element; and
    a multi-use data type identifier that identities which of a plurality of types of task data populates the task data fields.

18. The method of claim 17 wherein the variable length indicator indicates the number of octets that make up the generic information element after being populated with the task data.

19. The method of claim 17 wherein the variable length indicator indicates the number of task data fields.

20. The method of claim 17 wherein the plurality of types of task data includes at least one of authentication codes, personal identification numbers, feature codes, traffic band management (TBM) information, and packet data billing information.

21. The method of claim 17 wherein at least one of the messages comprises at least one of a connection management (CM) service request, a paging request, a paging response, a connect message, an assignment message, an assignment complete message, an assignment request message, abuse station service request, a flash with information message, a location updating request, an application data delivery service (ADDS) transfer message, and an ADDS deliver message.

22. The method of claim 17 wherein each generic information element further comprises an encoding scheme identifier that identifies an encoding scheme employed to encode the task data in the task data fields.

23. The method of claim 22 wherein the encoding scheme is one of binary coded decimal (BCD) even, BCD-odd, binary, and ASCII.

24. The method of claim 17 wherein the telecommunication system comprises a wireless communication system and wherein at least one of the first and second stations comprises one of a base station, a mobile station, a mobile switching center, a packet data serving node, and a packet control function.

* * * * *